United States Patent [19]

Kim et al.

[11] 4,348,794
[45] Sep. 14, 1982

[54] DOUBLE-WALLED FINNED HEAT TRANSFER TUBE

[75] Inventors: Sung C. Kim, Des Plaines; Marvin P. Schwartz, Arlington Heights, both of Ill.

[73] Assignee: International Telephone and Telegraph Corporation, New York, N.Y.

[21] Appl. No.: 168,033

[22] Filed: Jul. 11, 1980

Related U.S. Application Data

[62] Division of Ser. No. 903,049, May 5, 1979, Pat. No. 4,232,735.

[51] Int. Cl.³ ............................................. B23P 15/26
[52] U.S. Cl. .............................. 29/157.3 AH; 165/70; 165/183; 165/184; 138/104; 285/13; 29/157.4
[58] Field of Search ................ 29/157.4, 157.3 AH, 29/; 228/183, 184; 285/13; 165/70, 183, 184; 62/52; 138/148, 104, 173

[56] References Cited

U.S. PATENT DOCUMENTS

| 2,238,798 | 4/1941 | Lenk | 29/157.3 AH |
|---|---|---|---|
| 2,365,515 | 12/1944 | Baudry | 165/70 |
| 2,529,545 | 11/1950 | Edwards | 165/184 |
| 2,586,653 | 2/1952 | Hill | 29/157.3 AH |
| 2,724,979 | 11/1955 | Cross | 29/157.3 AH |
| 2,913,009 | 11/1959 | Kuthe | 29/157.3 AH |
| 2,981,072 | 4/1961 | Brewington | 285/13 X |
| 3,696,863 | 10/1972 | Kim | 165/181 |
| 3,750,444 | 8/1973 | Bittner | 29/157.3 AH |
| 3,777,343 | 12/1973 | Onofrio | 29/157.3 AH |
| 4,232,735 | 11/1980 | Kim | 165/184 |

FOREIGN PATENT DOCUMENTS

| 2803365 | 7/1978 | Fed. Rep. of Germany | 29/157.3 AH |
|---|---|---|---|
| 960628 | 6/1964 | United Kingdom | 165/70 |
| 1155899 | 6/1969 | United Kingdom | 165/70 |

*Primary Examiner*—Francis S. Husar
*Assistant Examiner*—V. K. Rising
*Attorney, Agent, or Firm*—James B. Raden; Donald J. Lenkszus

[57] ABSTRACT

A double-walled finned heat transfer tube is provided for use in heat exchangers. The heat transfer tube includes an inner tube inserted within an externally finned outer tube. The assembly is subjected to a crimping operation which produces radial convexities along the length of the outer tube which serve to lock the inner tube and outer tube together in intimate heat conducting relationship and which produces radial concavities between the inner and outer tubes which serve as leakage channels. The crimping operation also produces grooves in the external finned surface which improves heat transfer between the assembly and an external medium.

7 Claims, 9 Drawing Figures

DOUBLE-WALLED FINNED HEAT TRANSFER TUBE

This is a division of application Ser. No. 903,049 filed May 5, 1979 and now U.S. Pat. No. 4,232,735.

BACKGROUND OF THE INVENTION

1. Field of the Invention

This invention relates to heat exchangers and to heat transfer tubes employed therein, in general, and to double-walled heat transfer tubes in particular.

2. Description of the Prior Art

In some solar heating arrangements, heat exchangers may be required between the transfer medium circulated through a solar collector and the distribution medium. Furthermore, the U.S. Department of Housing and Urban Development in HUD Intermediate Minimum Property Standards Supplement, Solar Heating and Domestic Hot Water Systems, Document No. 4930.2, 1977 Edition at Section S-515-9 has set forth specific requirements for heat exchangers when a nonpotable liquid is used as the transfer medium between a solar collector and a potable water supply.

More specifically, one requirement is that the heat exchanger be designed such that a minimum of two walls or interfaces are provided between the nonpotable liquid and the potable water supply.

In one prior art heat exchanger, the toxic heat transfer medium circulates within an outer shell. An intermediary non-toxic heat transfer liquid is employed between the outer shell and a tube circuit carrying potable water. As the toxic heat transfer medium circulates through the shell, the intermediary liquid is heated which in turn heats the potable water supply circulating through the tube.

Another arrangement for providing a double separation between the transfer medium and the potable water supply consists of tubing wrapped around and bonded to a tank. The potable water is heated as it circulates through the coil or tank. One problem with this arrangement is that the tubing coil must be adequately insulated to reduce heat losses.

One problem with both arrangements is that they have relatively low heat transfer coefficients.

SUMMARY OF THE INVENTION

An object of the present invention is to provide new and improved heat exchangers of the tube type.

Another object is to provide new and improved double-walled finned heat transfer tubes for use in heat exchangers which are more efficient in operation and which can be economically produced.

A further object is to provide new and improved methods for producing double-walled finned heat transfer tubes.

In keeping with an aspect of the invention, these and other objects are accomplished by providing a double-walled heat transfer tube constructed of inner and outer tubes. The inner tube is inserted into and crimp connected to the externally finned outer tube to produce a rugged, unitary heat transfer tube structure having increased heat transfer efficiency.

Crimping of the assembly serves three purposes. First, the crimping operation locks the inner tube within the outer tube. Second, the crimping action reshapes the outer tube so that leakage channels are formed between the inner and outer tubes. With such leakage channels, a failure in the wall of either tube will provide a leakage which may be detected. Third, the crimping action on the previously externally finned outer surface causes distortion and bending of the external fins. These distorted and twisted fins increase the turbulence and fluid flow between the fins, thus improving the heat transfer.

DESCRIPTION OF THE DRAWINGS

The above-mentioned and other feature and objects of the invention and the manner of obtaining them will become more apparent, and the invention will be best understood by reference to the following description taken in conjunction with the accompanying drawings in which:

As shown in FIG. 1, an elongated tubular member 20 is provided having a plain, cylindrical surface. The tubular member 20 is initially subjected to processing to produce a plurality of integral upstanding fins 21 which project outwardly about the outer circumference of the tubular member 20 and lie in a substantially radial circumferential plane perpendicular to the principal axis of the tube 20.

As shown in FIG. 2, the upstanding fins 21 are annular in shape and extend perpendicularly outward from the outer surface of the tube 20 in a thread-like arrangement around the circumference of the tube 20. However, it will be understood that the upstanding fins 21 may be produced in a variety of shapes and configurations such as, for example, disconnected disc-like or circular shaped fins.

The manner of forming the upstanding fins 21 is not critical. For example, they could be formed on a screw-forming machine somewhat similar to the manner of threading a bolt. The fins may be formed such that they have annular shapes with a slight helical twist circumferentially disposed along the longitudinal axis of the tube 20.

It should be noted that end portions of the tube 20 are not finned to facilitate mounting and connection of the finished heat exchange tube as will be come apparent below.

Figure 1:
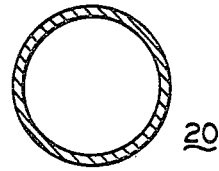
FIG. 1 is a cross-section view which shows the end of a tube as it appears at the start of a manufacturing process.
Figure 2:
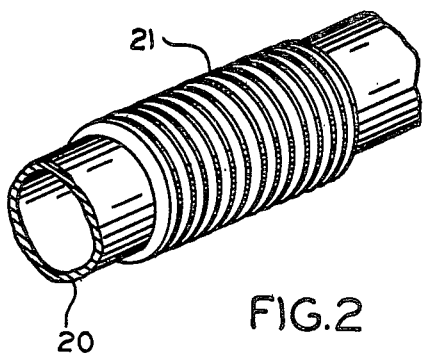
FIG. 2 shows a perspective view of the tube of FIG. 1 after an initial external fin forming step.
Figure 3:
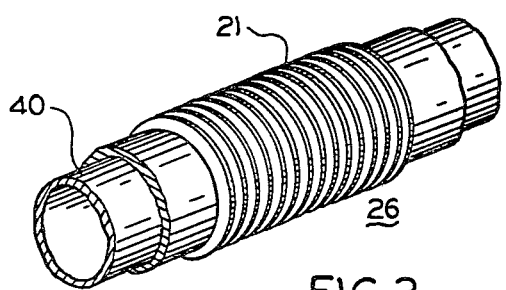
FIG. 3 shows a perspective view of the tube of FIG. 2 after insertion of a second tube therein.

As illustrated in FIG. 3, a second elongated tubular member 40 having a plain, cylindrical surface and outside dimensions less than the inside dimensions of the tubular member 20 is inserted into the tubular member 20. The tubular member 40 extends from either end beyond the end portions of the tubular member 20.

To attain effective and efficient heat transfer or flow between the tubular members 20 and 40, the contact between portions of the interior surface of the tubular member 20 and the external surface of the tubular member 40 must be a nearly perfect metal to metal contact. This contact must be such that there is no substantial space between the contacting surface portions where there might be a layer of heat insulating gas or air. In effect, virtually gas tight seals must be formed between the contacting portions of the interior surface of the tubular member 20 and the external surface of the tubular member 40.

Furthermore, leakage paths must be provided between the tubular members 20 and 40 to provide evidence of a failure in the wall of either tubular member.

Figure 5:
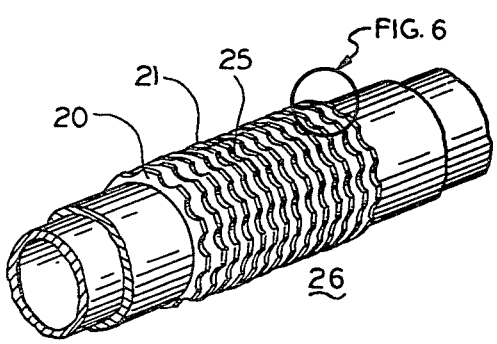
FIG. 5 shows the finished heat transfer tube.
Figure 6:
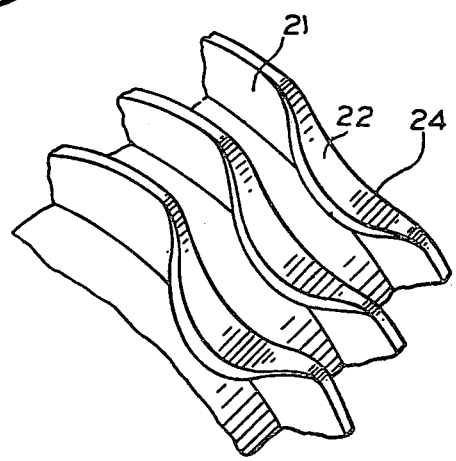
FIG. 6 is a fragmentary expanded view of the encircled area 6 of FIG. 5.
Figure 7:
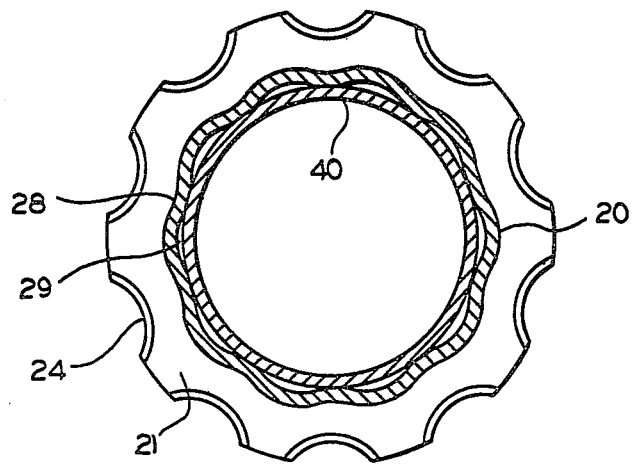
FIG. 7 is a cross-section view taken along line 7—7 of FIG. 6.

As illustrated in FIGS. 5 and 7, the inner tubular member 40 is assembled and locked within the tubular member 20 by inserting the tubular member 40 within the tubular member 20 and subjecting the assembly to inward crimping forces at a plurality of positions along the circumference of the outer surface of the tube 20. This crimp locking operation brings the external tubular member 20 into thermal contact with the inner tubular member 40 to provide good conductive heat transfer while also providing grooves or channels between the tubes which act as leak paths.

Figure 4:
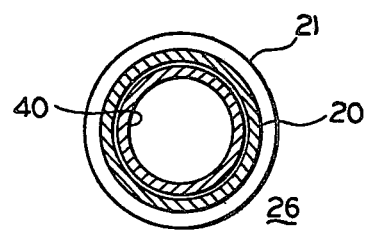
FIG. 4 is a cross-section of the assembly of FIG. 3.

More specifically, FIG. 7 shows an enlarged cross-section of the finished tube 26 of FIG. 5. Initially, as illustrated in FIG. 4, the cross-section of the tube 26 is of relatively smooth cylindrical shape. After crimping, as for example, with rollers, the tube 26 is reshaped to a generally corrugated cross-section as clearly seen in FIG. 7. The crimping force is such that the radially inward depressed portions 28 which may also be termed ribs or radial convexities of the tube 20 lock the tube 40 in position and provide the required metal-to-metal contact between the inner and outer tubes for efficient heat transfer. The channels 29 which may also be termed radial concavities formed between the tubes 20 and 40 as a result of the crimping provide leak detection passageways.

As illustrated in FIG. 3, the tube 26 initially has a plurality of upstanding annular fins 21 which project outwardly about the outer circumference of the tube 20 and extend outwardly along a radial plane thereof. After crimping, the annular fins 21 are reshaped to form a plurality of circumferentially disposed depressed regions 24 with somewhat shelf-like surfaces 22 extending away from the radial plane. The depressed regions 24, which are generally semicircular in cross-section, lie in planes which are approximately parallel to the outer surface of the tube 26. The depressed regions 24 on each fin are generally aligned with corresponding depressed regions on the other fins, as best illustrated in FIG. 4, to form grooves or flutes 25 which extend along the length of the tube 20. Preferably, these grooves 25 follow a slow helical or spiral pattern around the tube 20 which provides improved heat transfer characteristics to the tube 26. However, these grooves 25 may extend parallel to the longitudinal axis of the tube 20. The corrugations formed in the tube 20 will of course have the same pattern as the grooves 25. Advantageously, the depressed regions 24 on the fins cause increased turbulence of the fluid external to the tube 26 thereby improving the heat transfer chwaracteristics of the tube 26.

The tube 20 including the external fins 21, and the tube 40 are normally constructed from copper. However, other materials may be employed to meet specific conditions that are encountered in use.

Figure 8:
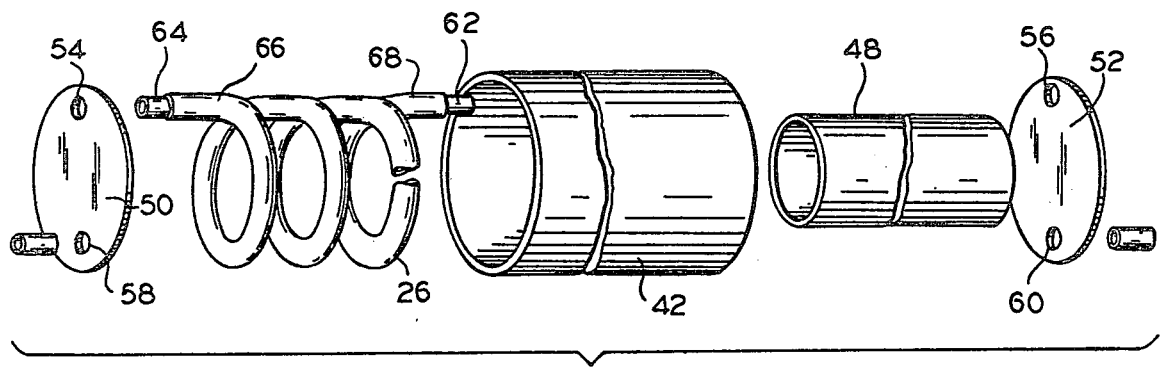
FIG. 8 is an exploded perspective view of a heat exchanger employing the double-walled heat transfer tubing of FIG. 5.
Figure 9:
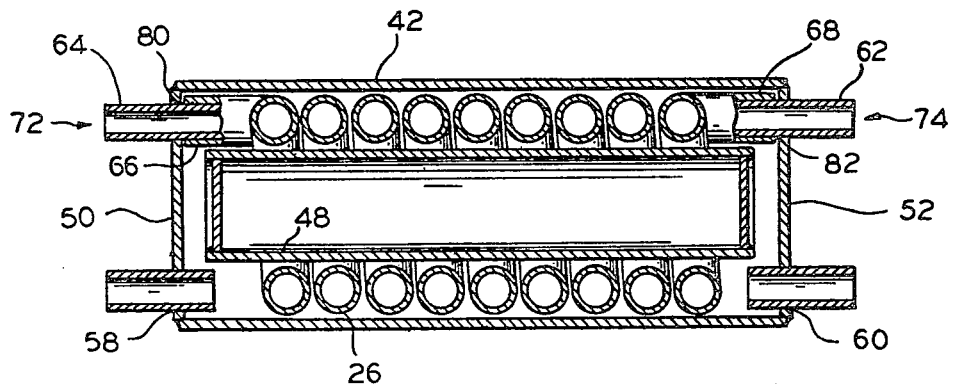
FIG. 9 is a cross-section of the assembled heat exchanger of FIG. 7.

A heat exchanger employing the invention double-walled heat transfer tubes is shown in exploded perspective view in FIG. 8 and in cross-section in FIG. 9. The heat exchanger includes an outer shell 42. A heat transfer tube 26 corresponding to the above-described tube 26 is coiled about an inner baffle 48 and positioned within the shell 42. End plates 50 and 52 are secured to the outer shell 42 by welding or brazing. Each end plate 50, 52 includes an aperture 54 and 56 through which the end portions of the tube 76 extend. Two ports are 58 and 60 provided in the end plates. Ports 58 and 60 are, respectively, the inlet and outlet ports for the fluid flowing within the shell 42 external to the tube 26. End portions 62 and 64 of the inner tube extend through the end plates 50 and 52 to serve as inlet and outlet ports 72 and 74, respectively, for the fluid flowing within the tube 26. End portions 66 and 68 of the outer tube 20 extend beyond the end plates 50 and 52, respectively, to provide ports 80 and 82 for the leakage paths formed between the inner and outer tubes 40 and 20, respectively.

In operation, fluids are individually introduced into the heat exchanger through inlet ports 60 and 72 by suitable means such as compressors, pumps, and the like not shown. One fluid, for example, potable water, enters port 72, then circulates through the inner tube 40 of the heat transfer tube 26 and is evacuated therefrom through outlet port 74. The other fluid, for example, ethylene glycol, enters the port 58 and flows between the inner baffle 48 and the inner wall of the shell 42. This other fluid comes into contact with the externally finned surface of tube 26 and the fins 21 creating turbulence in the fluid flow which serves to more completely bring fluid into contact with the tube surface and thus to improve the heat transfer efficiency of the unit. The fluid continues to flow through the heat exchanger being exposed to heat transfer effects throughout the flow path. Eventually, the fluid reaches outlet port 60 where it is forced out of the unit.

If a fault such as a pin hole should occur in the wall of either the inner tube 40 or outer tube 20, fluid will enter the leakage channels 29 formed between the tubes 20 and 40. This leakage will eventually appear at either or both of the leakage ports 80 and 82 where a means for detecting leakage flow may be provided.

While the principles of the invention have been described above in connection with specific apparatus and applications, it is to be understood that this description is made only by way of example and not as a limitation on the scope of the invention.

We claim:

1. The method of forming a double-walled heat transfer tube comprising the steps of:
    (a) forming an elongated inner tubular member;
    (b) forming an elongated outer tubular member having dimensions such that said ouer tubular member fits over said inner tubular member;
    (c) subjecting at least a portion of the outside surface of said outer tubular member to an operation so as to produce external fins on the outer tubular member;
    (d) assembling said inner tubular member inside outer tubular member;
    (e) subjecting said assembly to inward crimping forces to lock said inner tubular member within said outer tubular member and to reshape said outer tubular member to form a plurality of radial convexities and concavities, the inner surface of said convexities being in intimate contact with the outer surface of said inner tubular member and said radial concavities forming channels between said inner and outer tubular members.

2. The method of claim 1, wherein said crimping forces reshape said external finned surface to form a plurality of grooves, said grooves extending along the length of said outer tube and each of said grooves being aligned with a corresponding one of said plurality of convexities.

3. The method of claim 2, wherein said grooves follow a slow helical configuration around said outer tubular member.

4. The method of forming a tubular heat transfer tube comprising the steps:
of subjecting a first elongated tubular member to a finning operation to produce an external finned surface;
inserting a second elongated tubular member inside said first tubular member, said second tubular member having an outside diameter less than the inside diameter of said first tubular member;
subjecting the assembly of said first and second tubular members to inward crimping forces at circumferentially spaced apart zones to deform said first tubular member in the area of said zones such that said first tubular member in said zones is in tight locking engagement with said second tubular member and said first tubular member is spaced apart from said second tubular member intermediate said zones.

5. The method in accordance with claim 4 wherein said crimping forces reshape said external finned surface in the areas of said zones to form grooves.

6. A method of forming a heat transfer tube comprising the steps of:
assembling a first elongated tubular member inside a second elongated tubular member having a finned outer surface; and
subjecting the assembly of said first and second tubular members to a rolling operation to provide a plurality of circumferentially spaced radial deformations in the cross-section of said second tubular member which are in tight engagement with said first elongated member and to provide a plurality of leakage flow channels intermediate said plurality of radial deformations.

7. The method in accordance with claim 6 wherein said plurality of radial eformations follow a slow helical configuration around said second tubular member.

* * * * *